Oct. 10, 1950     E. C. HALLETT     2,525,131
DIESEL ENGINE

Filed April 15, 1946     3 Sheets-Sheet 1

ELTON C. HALLETT,
INVENTOR.

BY Webner, Matty & Beehler
ATTORNEYS.

Oct. 10, 1950     E. C. HALLETT     2,525,131
DIESEL ENGINE

Filed April 15, 1946     3 Sheets-Sheet 2

ELTON C. HALLETT,
INVENTOR.

BY
Lefebvre, Maltby & Beehler
ATTORNEYS.

Oct. 10, 1950  E. C. HALLETT  2,525,131
DIESEL ENGINE
Filed April 15, 1946  3 Sheets—Sheet 3
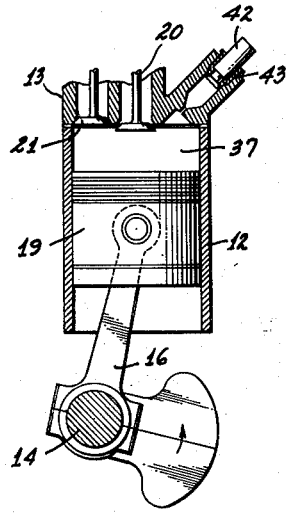
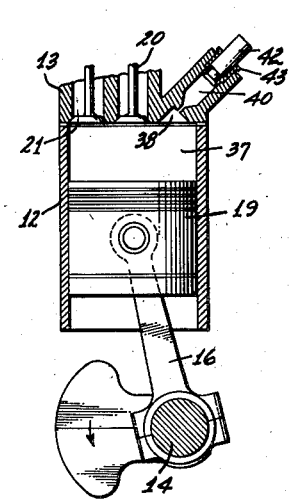
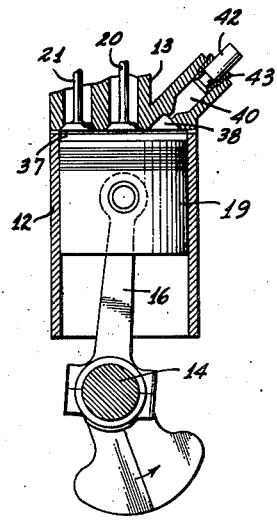
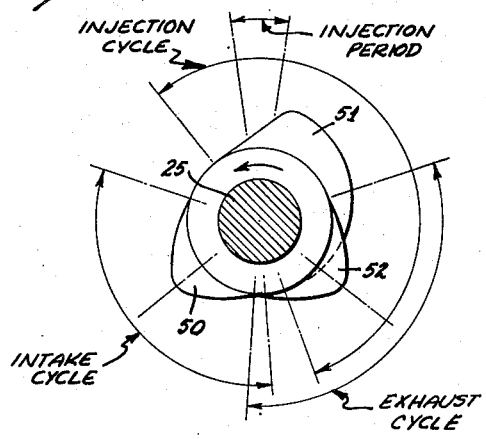
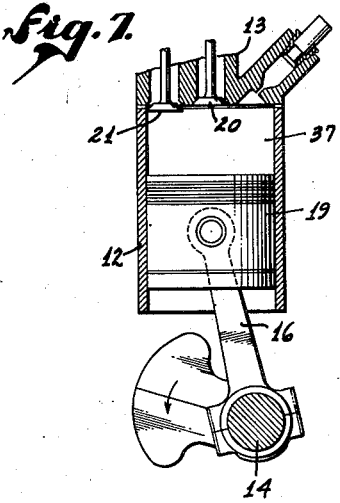
Elton C. Hallett,
INVENTOR.

Patented Oct. 10, 1950

2,525,131

UNITED STATES PATENT OFFICE 2,525,131

DIESEL ENGINE

Elton C. Hallett, Los Angeles, Calif., assignor, by mesne assignments, to Hallett Manufacturing Company, Inglewood, Calif., a corporation of California Application April 15, 1946, Serial No. 662,198

3 Claims. (Cl. 123—33)

1

The invention relates to Diesel engines and has particular reference to a means of varying the volume of the combustion space so that the engine may be capable of efficient operation under either high or low altitude conditions.

Diesel engine design has been standardized to a very great extent, particularly with reference to fuel injection systems, and the engine as a general rule has been of a rather inflexible construction preventing it from being readily adapted to changes in operating conditions without a rather extensive modification in design of the engine parts.

It is, therefore, among the objects of the invention to provide a new and improved means for varying the operative characteristics of a Diesel engine without change or alteration in the basic design of the invention.

Another object of the invention is to provide a new and improved arrangement for a precombustion or cracking chamber which can be quickly and conveniently changed to meet new requirements of engine operation without it being necessary to disassemble the engine in any manner.

Still another object is to provide a new and improved means for changing the capacity of the cracking chamber and expansion area above the piston head by the simple expedient of making changes in gasket thickness of parts of the engine which are under relatively no pressure, thereby effecting a change in the relationship of the piston to the piston head without it being necessary to remove or in any way alter the connection of engine parts which must operate under high pressure.

Still further among the objects of the invention is to provide a new and improved spreading arrangement for expanding gases so that they may more quickly and efficiently expand their effect upon the piston during a combustion stroke.

With these and other objects in view, the invention consists in the construction, arrangement and method of making and combining the various parts of the device whereby the objects contemplated are attained, as hereinafter more fully set forth, pointed out in the claims and illustrated in the accompanying drawings, in which:

Figures 4, 5, 6 and 7 are successive diagrammatic views showing the relative position of the piston at different stages of engine operation.

Figure 8 is a diagrammatic view of a cam shaft for the engine showing the design of the cams which operate the valves and injector.

Figure 1:
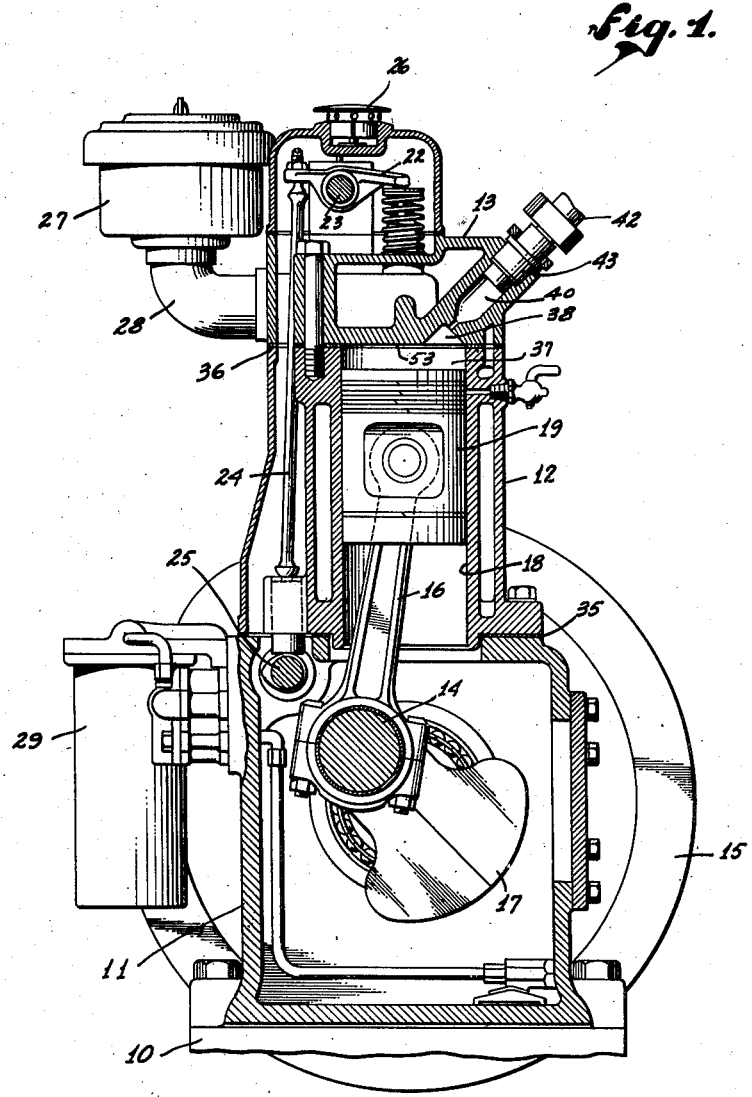
Figure 1 is a longitudinal, sectional view of a Diesel engine of conventional construction incorporating the improvements featured in the invention.

It is commonly known that in the Diesel type of engine because of high pressures involved the engine construction must be relatively heavy in proportion to the amount of horse power developed, emphasis being placed upon economy of operation. Due to the fact that the engine parts must be of a substantially heavy construction and must operate under high pressures, they are customarily designed so that when once assembled they may not be as readily disassembled for reconditioning and alteration as are the later types of engines. Although Diesel engines as a general rule have found greater favor where heavy hauling is a factor, as for example on tractors, trucks and marine engines which are under constant load, new demands have been made for economical engine operation which encourage the use of Diesel engines in new fields where economy of operation is a factor.

Difficulty has been experienced in readapting Diesel engines to new uses because of a rather inflexible engine design. Lack of versatility has therefore handicapped setting the Diesel engine of standard design to new uses and particularly in adapting an engine of standard design to uses where air pressure conditions might be quite different as, for example, at high altitudes.

Although a new Diesel engine might be designed capable of use in high altitudes or in places where the air pressure differs considerably, specially designed engines are uneconomical to such an extent that unless engines of standard design can be adapted to the new field of operation, use of standard Diesels under extraordinary circumstances would be considerably curtailed.

In illustrating the improvement comprising this invention which is designed to facilitate adaptation of Diesel engines of standard construction to uses under varied conditions there is illustrated in the drawings a somewhat conventional style of engine.

Figure 2:
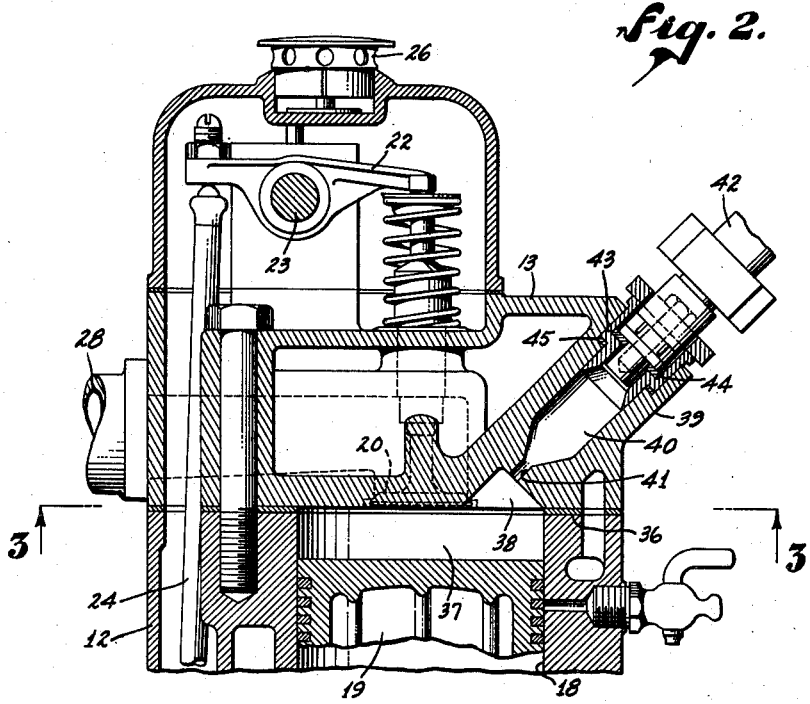
Figure 2 is a longitudinal, sectional view of the upper portion of the Diesel engine shown in Figure 1 drawn to a larger scale.
Figure 3:
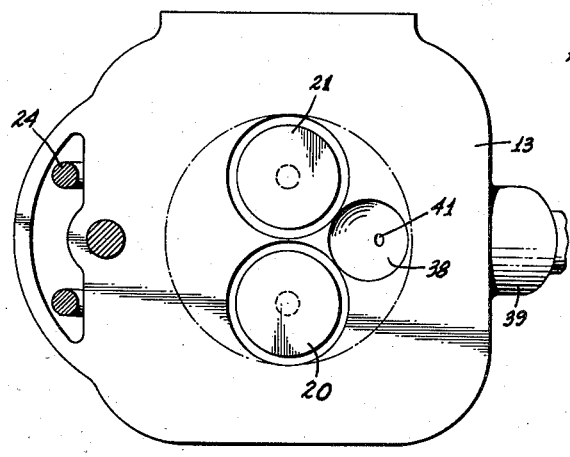
Figure 3 is a cross-section taken on the line 3—3 of Figure 2.

In the drawings and particularly in Figures 1, 2 and 3 a Diesel engine comprising a base 10 is shown upon which is mounted a crank case 11 and above the crank case a cylinder block 12 surrounded by a cylinder head 13. The construction is one suited to 2, 3, 4 or more cylinders.

Within the engine case is a crank shaft 14 at one end of which is a flywheel 15. A connecting rod 16 is shown attached by customary means to the crank shaft opposite a counterbalance 17. The crank shafts and counterbalances will correspond to the number of cylinders in the engine. Within each cylinder block is a bore 18 within which is slideably mounted a piston 19 attached to the upper end of the connecting rod.

The engine is provided with the customary intake and exhaust valves 20 and 21, respectively, which are shifted between on and off positions by properly located rocker arms 22 pivoting about a shaft 23 and in turn actuated by rods 24 through operation of suitable cams on a cam shaft 25. An exhaust vent 26 is provided in the piston head, and an air filter 27 communicates with the intake valve 20 through an air intake pipe 28. An oil filter 29 is likewise provided through which passes oil from the crank case.

It is important to note that the cylinder block and crank case are separated from each other at their points of contact by means of a gasket member 35 which is preferably of metal and which can be readily varied in its thickness by a change in the thickness or the number of layers of material so that the cylinder block may be spaced a greater or lesser distance above the top of the crank case, as may be desired.

The cylinder head is likewise separated from the top of the cylinder block by another gasket 36. In this case, however, the gasket may be of conventional construction and so designed that it need not be capable of removal and replacement any more frequently than is normally anticipated for overhauling purposes.

Above the piston within the cylinder bore is a combustion space 37 and above the combustion space is an auxiliary pocket or spreading cone 38 which is small in cross-sectional area relative to the area in cross-section of the cylinder bore. The pocket is specially shaped, however, so that its axis is directed obliquely toward the top of the bore, the deep side being directed toward the remote side of the bore. Adjacent the pocket the cylinder head is provided with a boss 39 within which is a cracking chamber 40 communicating with the auxiliary pocket through a restricted passage 41 axially disposed relative to the cracking chamber but located near the deep side of the pocket 38.

Fuel is forced into the cracking chamber by means of an injector 42 which has its position with respect to the cracking chamber fixed by means of the interposition of a thimble 43. The thimble is provided on one side with a packing 44 to seal it with respect to the injector and a packing 45 on the opposite side to seal the thimble with respect to the cracking chamber. The injector itself may be of conventional construction.

For convenience in following the operation of the engine the piston is shown at different positions in Figures 4, 5, 6 and 7 which correspond with cams located upon the cam shaft 25 in the relative positions shown in Figure 8.

For example, Figure 4 shows the position of the piston during a suction stroke. In this position the intake valve 20 is open, the exhaust valve 21 is closed, and the piston 19 is presumed to be moving downwardly by reason of counterclockwise rotation of the crank shaft 14. During this movement the combustion space 37 is enlarged, the space being filled with air. For this operation a cam 50 will be moving its respective rod 24 in an upward direction.

In Figure 5 the piston is shown during a compression stroke. This time the piston 19 will be moving upwardly, and both valves 21 and 20 will be closed. Air previously admitted to the combustion space 37 will be compressed, and a substantial portion of it will be forced into the pocket 38 and eventually into the cracking chamber 40.

Figure 6 shows the piston 19 in topmost position ready for a combustion stroke, the valves 21 and 20 still being closed. At this point a cam 51 will have rotated to a position where through a suitable linkage the fuel injection system will be placed into operation, and fuel will be forceably injected by the injector 42 into the cracking chamber 40 where it will mix with the air which has been compressed under very high pressure as is customary in Diesel operation.

Combustion then takes place, and the piston 19 will be driven by force of the explosion in a downward direction and thus impart power to the crank shaft.

After completion of the combustion stroke, the piston 19 will again move upwardly, but during this upward stroke the exhaust valve 21 will be opened because of movement of a cam 52 against the respective rod 24. It will be apparent that for this arrangement the cam shaft must be geared at a ratio of one to two with respect to the crank shaft. This operation is followed by the suction stroke described in connection with Figure 4.

It will be noticed that at the upper end of every compression stroke just prior to the beginning of the combustion stroke the top of the piston 19 is extremely close to the face 53 of the cylinder head which forms the closed top of the combustion space 37. Some space, however, does remain. A large proportion of the air which has previously been admitted will be forced by compression exerted by the piston into the space defined by the pocket 38 and then through the passage 41 into the cracking chamber 40.

Normally the size of the cracking chamber will be designed for proper operation under normal atmospheric pressure which is the pressure at sea level. There may, however, be occasions when the engine will be required to run continuously at higher altitudes or for that matter at lower altitudes. In the case of higher altitudes air admitted to the combustion space although of the same volume as air at sea level will be of less density. Consequently, when the less dense air is compressed, if it is to be compressed to the same high pressure required for efficient engine operation, it must be compressed into a smaller space.

In order that the standard type of engine described herein be readjusted to provide a smaller space for the highly compressed air, the cylinder block is removed from the crank case and the gasket 35 removed and replaced by a gasket of lesser thickness. When the cylinder block is reapplied the top of the cylinder bore 18 will, under the circumstances last described, be lower with respect to the top of the piston 19. This means that when the piston is at the very top of its movement at the completion of a combustion stroke it will be closer to the face 53, and consequently the volume of the combustion space 37 at this point will be less than the volume under normal conditions as first described.

Under high altitude operating conditions it is also necessary to reduce the volume of the cracking chamber so that there will be a proper balance between the quantity of gasified fuel and the quantity of compressed air mixed with it. This is accomplished by removing the injector 42, removing the thimble 43 and replacing the thimble 43 by a new thimble which extends deeper into the cracking chamber and thus partly fills the space within the cracking chamber to a greater extent than does the thimble designed for sea level operation. This important change is thus effected by the mere substitution of a new thimble without it being necessary to alter the design or construction of any of the working parts of a standard Diesel engine, cylinder head and injector system.

When these two simple adjustments are made a Diesel engine of standard construction may be quickly and readily adapted to efficient operation under conditions such as high altitude conditions where the density of air is extremely different from the density of the air at sea level conditions where the engine is designed to operate normally.

Should there exist such conditions as would raise the density of air above that experienced at sea level, adjustments of the same general nature can be made with respect to the gasket 35 and the volume of the cracking chamber 40 so as to accommodate a volume of air of greater density. Conditions of this sort might exist in sub-surface operation of naval craft, for example. In the last example thickness of the gasket 35 will be increased and the thimble 43 replaced by one providing a greater capacity within the chamber 40.

It will be apparent, therefore, from the foregoing description that by use of the novel arrangement shown and described a Diesel engine of standard construction can be quickly, efficiently and inexpensively altered so that it will operate efficiently under conditions vastly different from normal conditions. The change contemplated is such a simple one that it can be made quickly and without necessity for making any substantial variation in engine parts normally used for engines of this type.

Although the invention has been herein shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent structures.

The invention having been herein described, what is claimed and sought to be secured by Letters Patent is:

1. A Diesel engine comprising an engine base, a crank case thereon adapted to receive a crank shaft, a cylinder block on the crank case having a cylinder bore therein communicating with the crank case and a reciprocating piston in the bore dividing said bore into low pressure and high pressure chambers, endwise movable connections and a sealing and spacing gasket between the cylinder block and the crank case at the location of the low pressure chamber, said gasket being of predetermined fixed thickness and adapted to be removed for replacement with a gasket of different thickness, an engine head on the cylinder block and a permanent seal between the engine head and the cylinder block, said engine head having therein an obliquely disposed cracking chamber comprising a cylindrical walled portion and a tapered inner end, a cylindrical central outlet passage at the inner end and a spreading chamber communicating with the cylinder bore and the outlet passage, said cracking chamber, said central aperture and said spreading chamber having walls disposed in the same longitudinal direction, a thimble having a cylindrical end fitting within said cylindrical walled portion and an injector receiving pocket, and an annular seal between the thimble and the engine head, said cylindrical end of the thimble having an extended location in the cracking chamber determinative of a space in said cracking chamber having a volume corresponding to the length of the cylinder bore, said thimble being adapted for removal from a position between the engine head and the ejector for replacement in said position by a thimble having a cylindrical end of different size corresponding to conditions wherein said gasket has been replaced by a gasket of different thickness and said cylinder bore has a different length.

2. A Diesel engine comprising an engine base, a crank case thereon adapted to receive a crank shaft, a cylinder block on the crank case having a cylinder bore therein communicating with the crank case and a reciprocating piston in the bore dividing said bore into low pressure and high pressure chambers, endwise movable connections and a sealing and spacing gasket between the cylinder block and the crank case at the location of the low pressure chamber, said gasket being of predetermined fixed thickness and adapted to be removed for replacement with a gasket of different thickness, an engine head on the cylinder block and a permanent seal between the engine head and the cylinder block, said engine head having therein an obliquely disposed cracking chamber and a spreading chamber communicating therewith and with the cylinder bore, a thimble having an end fitting within said cracking chamber and an injector receiving pocket, and an annular seal between the thimble and the engine head, said end of the thimble having an extended location in the cracking chamber determinative of a space in said cracking chamber having a volume corresponding to the length of the cylinder bore, said thimble being adapted for removal from a position between the engine head and the injector for replacement in said position by a thimble having an end of different size corresponding to conditions wherein said gasket has been replaced by a gasket of different thickness and said cylinder bore has a different length.

3. A Diesel engine comprising an engine base, a cylinder block for the engine having a cylinder bore therein and a piston in the bore dividing said bore into low pressure and high pressure chambers, an engine head on the cylinder block and a permanent seal between the engine head and the cylinder block, said engine head having integrally disposed therein an obliquely disposed cracking chamber comprising a cylindrical walled portion and a tapered inner end, a cylindrical outlet passage at the inner end and a spreading chamber communicating with the cylinder bore and the outlet passage, said cracking chamber, said outlet passage and said spreading chamber having walls disposed in the same longitudinal direction, a thimble having an end fitting within said cylindrical walled portion and an injector receiving pocket, and an annular seal between the thimble and the engine head, said end of the thimble having an extended location in the cracking chamber determinative of a space in said cracking chamber having a volume corresponding to the minimum volume of the pressure chamber of the cylinder bore, said thimble being adapted for removal from a position between the engine head and the injector for replacement by a thimble having an end of different size corresponding to conditions wherein the pressure chamber of said cylinder bore has a different minimum volume.

ELTON C. HALLETT.

REFERENCES CITED

The following references are of record in the file of this patent:

UNITED STATES PATENTS

| Number | Name | Date |
|---|---|---|
| 983,646 | Roberts et al. | Feb. 7, 1911 |
| 1,093,659 | Thornley | Apr. 21, 1914 |
| 1,413,466 | Gaertner | Apr. 18, 1922 |
| 1,477,984 | Suter | Dec. 18, 1923 |
| 1,520,353 | Kavanaugh | Dec. 23, 1924 |
| 1,532,788 | Vandervell | Apr. 7, 1925 |
| 2,242,274 | Thysse | May 20, 1941 |
| 2,332,928 | Pischinger et al. | Oct. 26, 1943 |

FOREIGN PATENTS

| Number | Country | Date |
|---|---|---|
| 424,671 | France | Mar. 20, 1911 |